United States Patent [19]

Prescott et al.

[11] Patent Number: 4,926,896
[45] Date of Patent: May 22, 1990

[54] SENSITIVE ELECTRICAL TO MECHANICAL TRANSDUCER

[75] Inventors: Robert C. Prescott, N. Marshfield, Mass.; Robert J. Robinson, Derry, N.H.

[73] Assignee: Dresser Industries, Inc., Dallas, Tex.

[21] Appl. No.: 289,224

[22] Filed: Dec. 23, 1988

[51] Int. Cl.$^5$ .................. G05D 16/00; H01F 7/14
[52] U.S. Cl. .................. 137/82; 251/129.08; 335/229
[58] Field of Search .............. 137/82; 251/129.08; 335/230, 229

[56] References Cited

U.S. PATENT DOCUMENTS

| | | |
|---|---|---|
| 3,441,053 | 4/1969 | Robinson . |
| 4,362,182 | 12/1982 | Sjolund .................. 137/82 X |
| 4,492,246 | 1/1985 | Prescott et al. . |
| 4,527,583 | 7/1985 | Simpson . |
| 4,546,338 | 10/1985 | Idogaki .................. 335/229 |
| 4,554,938 | 11/1985 | Twisselmann .................. 137/82 |
| 4,574,843 | 3/1986 | Loup .................. 137/625.54 X |
| 4,595,029 | 6/1986 | Roth . |
| 4,690,371 | 9/1987 | Bosley .................. 251/129.08 |

OTHER PUBLICATIONS

Hicorex-Nd H-97, Neodymium-Iron-Boron Permanent Magnets, Hitachi Magnetics Corporation, dated Nov. 1986.

Primary Examiner—Alan Cohan

[57] ABSTRACT

A transducer having a cross field polarized permanent magnet mounted for slight pivotal movement within an annular coil winding. The magnet comprises neodymium-iron-boron to provide a compact, lightweight, low inertia and high intensity magnetic field. A magnetic field generated by current in the coil winding influences the permanent magnet to pivot slightly about a horizontal axis and rotate a yoke structure to produce a mechanical output of the transducer. In the preferred embodiment of the invention, the yoke is attached to a spring arm for controlling escape gas pressure from a nozzle to thereby control the pressure of a gas stream.

84 Claims, 3 Drawing Sheets

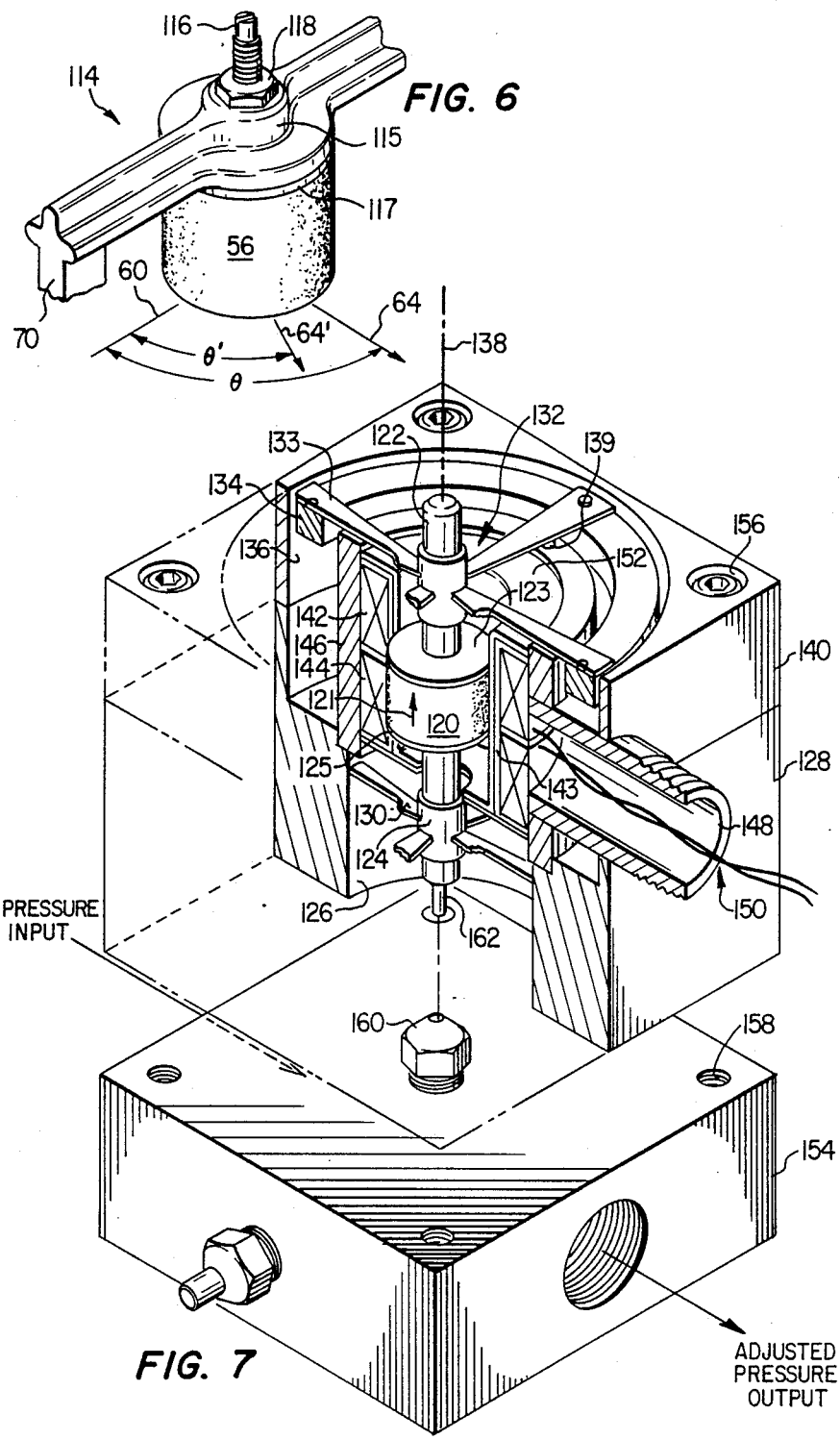

SENSITIVE ELECTRICAL TO MECHANICAL TRANSDUCER

TECHNICAL FIELD OF THE INVENTION

The present invention relates in general to transducers, and more particularly to the type of transducers which convert electrical input signals to either mechanical or pressure outputs.

BACKGROUND OF THE INVENTION

Transducers are employed in a variety of applications for converting one form of energy into another. The forms of energy which often require conversion include electrical, mechanical, pressure, light, heat, sound, etc. It can be appreciated that transducers are necessary in most machines or equipment as it seldom happens that a machine does not operate between two or more forms of energy.

The development and manufacture of transducers have become highly competitive fields. There is a constant effort to provide transducers which are more reliable, accurate, less costly, easily manufacturable and more compact. Current to pressure transducers are among a class of transducers which requires a high degree of accuracy and reliability, while yet remaining cost effective. U.S. Pat. Nos. 3,441,053; 4,492,246; and 4,527,583 disclose sophisticated transducers, generally adapted for converting electrical input energy through an intermediate mechanical medium to control an output gas pressure. The first of the noted patents is mechanically complicated, while the two latter-identified patents are highly sophisticated and require a large number of electrical components. As is usually typical, an improvement in the reliability or accuracy of a transducer is generally accompanied by an increase in the complexity of the equipment.

Many transducers, and especially the electrical to pressure type of transducers which are utilized in hydrocarbon refineries, are required to be explosion-proof. Special precautions including highly sophisticated and costly enclosures have been adapted to render such transducers mechanically sound and sturdy to contain an internal explosion, if one should occur, and prevent the resulting fire or flame from spreading to the environment. Special attention is also given to circuit elements which can store electrical energy, such as inductors and capacitors, to reduce or eliminate the likelihood of such elements generating sparks. The explosion-proofing by encasement of a transducer of the type having a moving coil winding can be extremely difficult. Typically, it is expedient to mount the coil movable with respect to a permanent magnet, as magnets are generally much heavier and more bulky than the associated coils. In such a transducer, the electrical input is applied to the moving coil which then moves under the influence of the fixed permanent magnet. By virtue of its requirement to move in correspondence with the amount of current applied to the coil, it is extremely difficult to encase such a coil and render the entire transducer explosion-proof.

From the foregoing, it can be seen that a need exists for an improved electrical to mechanical transducer which is reliable, cost effective, accurate and easily manufacturable. An associated need exists for an explosion-proof transducer of the type having a lightweight permanent magnet and a coil winding combination, but with the winding fixed to a frame structure to thereby make explosion-proofing of the transducer much easier. Another need exists for an improved current to pressure transducer having a lightweight movable magnet with a high degree of permanent magnetization such that a smaller magnet can be employed, thereby also reducing the size and complexity of the transducer. Yet another need exists for a transducer structure which is of reduced complexity, which has few moving parts, a fast response time and which is yet accurate and reliable.

SUMMARY OF THE INVENTION

In accordance with the invention, there is disclosed an improved transducer which substantially reduces or eliminates the shortcomings and disadvantages of prior, well-known transducers. According to the invention, a permanent magnet constructed of a material having an extremely high degree of magnetization is mounted for movement with respect to a coil winding. The coil winding is, in turn, fixed to a frame structure of the transducer so that it can be easily encased with an enclosure to explosion-proof the transducer unit. In response to varying amplitudes of current by which the coil winding is driven, the permanent magnet moves accordingly. A spring arm or other extension is mounted to the permanent magnet so that when the magnet moves, a corresponding mechanical output is produced by the transducer. The mechanical output can be utilized in conjunction with a nozzle to control pressure and thereby function as a current to pressure transducer.

In the preferred embodiment of the invention, the permanent magnet is constructed of neodymium-iron-boron composition to provide a magnetic energy product in the neighborhood of 30,000,000 gauss-oersted. In addition, the magnet is cross-field polarized in a direction transverse to an axis of the magnet. When mounted within the magnetic influence of the coil winding so that the horizontal pivotal axis of the magnet is transverse to a vertical axis about which the coil winding is centered, the magnet pivots in correspondence with the electrical energization of the coil winding.

Preferably, the permanent magnet is fixed to a yoke structure so that it is suspended within a coil winding. The arms of the yoke structure are pivotally mounted outside of the coil winding by flexure strips so that the permanent magnet is constrained for very accurate pivotal movement in the manner noted.

The transducer of the invention is rendered less susceptible to vibration by constructing the coil winding bobbin of a conductive, but nonmagnetic material. In this manner, movement of the permanent magnet with respect to the coil winding due to vibration produces a magnetomotive force and resulting countermagnetomotive force between the permanent magnet and the winding bobbin, thereby offsetting the effects of vibration. The conductor of the coil winding can be wound around the bobbin, and the combination inserted within a case, and sealed, to provide an explosion-proof unit. The case of the transducer can be provided with a channel to form a conduit and allow safe accessibility to the conductors of the winding.

In another embodiment of the invention, the movable high energy permanent magnet can be fixed to an elongate axle rod which is axially aligned with the axis around which the coil winding is centered. In this instance, the permanent magnet is magnetized in a direction coaxial with its axis. The rod of the magnet is mounted to the transducer case such that it moves with respect to a nozzle in a linear path, coextensive with the axis of the coil winding. The permanent magnet moves by an amount corresponding to the magnitude of the current carried by the coil winding. An antivibration counterweight is flexibly mounted to the magnet so that the tendency of the magnet to move in response to vibration is offset by the movement of the counterweight. The gas pressure, which is controlled by the transducer, is thus not modulated by the vibration.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or elements throughout the views, and in which:

FIG. 6 is an isometric view of a portion of a yoke which is adapted for fixing a permanent magnet thereto at different angular orientations to obtain span adjustments of the mechanical output of the transducer; and FIG. 7 is an isometric view of a current to pressure transducer according to an alternative embodiment of the invention.

DETAILED DESCRIPTION OF THE INVENTION

Figure 1:
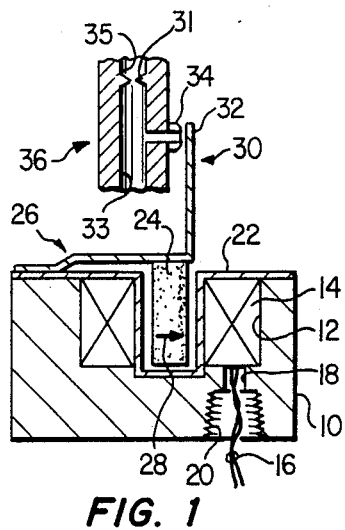
FIG. 1 is a generalized sectional view of an exemplary current to pressure transducer for illustrating the principles and concepts of the invention.

FIG. 1 comprises transducer structure for illustrating the principles and concepts of the invention. The major components of the transducer include a case 10 for providing a frame structure for mounting thereto the other components of the transducer. The case 10 is preferably constructed of a soft steel to provide a magnetic field return path. The case 10 is constructed with a cylindrical bore 12 for holding therein a reel-shaped coil winding 14. The ends of the electrical conductor forming the coil winding 14 are routed through an internal conduit 18 formed within the case 10. An internally threaded opening 20 is formed in communication with the conduit 18 for providing access to the ends 16 of the coil winding conductor. An enclosure 22 can be easily and economically fixed to the case 10 for encasing the coil winding 14 and rendering it inaccessible to puncture or other damage, thereby containing any ignition and making the transducer explosion-proof.

A permanent magnet 24 with an extremely high magnetic intensity is mounted by means of arm 30 with respect to the case 10 so as to be pivotally movable about a flexible portion of arm 30 defining an axis 26. Moreover, the permanent magnet 24 is magnetized in the direction of a vector arrow 28 to define a cross-field polarized permanent magnet. When magnetized in the direction noted, a current applied to the coil winding 14 produces a magnetic field which influences the permanent magnet 24 so that it exhibits a tendency to rotate or pivot. Preferably, the magnet 24 is mounted very close to the coil winding, and thus it pivots much less than 10°, and even less than 1°. Depending upon the polarity of the current applied to the coil winding 14, the permanent magnet 24 will tend to rotate either clockwise or counterclockwise.

An arm 30 providing a mechanical output of the transducer is fixed with respect to the case 10, and particularly is shown fixed to the coil bobbin enclosure 22. The arm 30 is constructed of a material which can be flexed for the reasons specified below. The arm 30 is adhered, cemented, or otherwise fixed to the permanent magnet 24 so as to be movable about axis 26 in response to the movement of the magnet 24. In the preferred embodiment of the invention, the arm 30 includes an extension 32 which cooperates with a nozzle 34 to cause a change in a gas pressure in correspondence with a change in the magnitude of the current through the coil winding 14. The nozzle 34 is of conventional design, for cooperating with the arm extension 332 to cause a change in the pressure of the gas within the pressurized line 36. As is conventional, when the arm extension or flapper 32 moves closer to the orifice in the nozzle 34, the pressure at outlet 33 is increased, due to accumulation of the flow of gas from supply end 35 through restriction 31. Conversely, as the flapper 32 moves away from the orifice of the nozzle 34, the gas pressure at the outlet end 33 decreases. Hence, a change in the pressure within the gas line 36 can be achieved.

The conversion of the electrical current to a specified gas pressure in the line 36 is carried out by driving the coil winding 14 with a predetermined DC current. A magnetic field of an associated magnitude will be generated by each winding of the coil 14, thereby influencing and imposing a torque to the permanent magnet 24. The permanent magnet 24, being magnetized according to the vector arrow 28, will rotate either clockwise or counterclockwise about axis 26, depending upon the polarity of the current. When rotated or pivoted, the permanent magnet 24, being attached to the arm 30, causes a corresponding movement of the arm extension 32. If current is driven into the coil winding 14 in one direction, the arm extension 32 will move closer to the orifice of the nozzle 34, thereby closing off the orifice and increasing the pressure within the pressurized gas line 36. On the other hand, by driving a current the other direction in the coil winding 14, the arm extension 32 will be moved in an opposite direction, whereupon the orifice within the nozzle 34 will be opened and the gas pressure within the line 36 will be decreased.

In accordance with an important feature of the invention, the permanent magnet 24 is constructed of a material composition comprising neodymium-iron-boron. The permanent magnet of such a composition is obtainable from Hitachi Magnetics Corporation, Edmore, Michigan, under trademark HICOREX-Nd. Such magnets are obtainable with extremely high magnetic energies of about 30,000,000 gauss-oersted. The magnets are available at reasonable costs and are not affected by physical impact or shock, as are most Alnico-type magnets. Importantly, the weight of such type of permanent magnets is less than that of coil windings formed of copper conductors, and thus it becomes advantageous to mount the lightweight permanent magnet 24 for movement, rather than the coil winding 14. The neodymium-iron-boron constructed magnet weighs about 7.5 gram/cc, thus making it compact and having a characteristic low inertia. As can be appreciated, the moment of inertia of a solid magnet is smaller than that of a moving coil, and thus the magnet 24 is more responsive to fast changes in the magnetic field of the coil winding 14. The coil winding 14 can be wound with a desired number of windings of a small wire gauge to establish a selected magnetic field and coil resistance combination. When utilizing such a current to pressure transducer with hydrocarbon refinery apparatus, the coil winding 14 should have a resistance no greater than about 200 ohm. The standards established in the refinery environment specify that control currents should be within 4-20 ma. With a solid copper wire gauge of 38, the coil can be wound with a significant number of turns to achieve a magnetic field sufficient to cause rotation of the permanent magnet 24.

Figure 2:
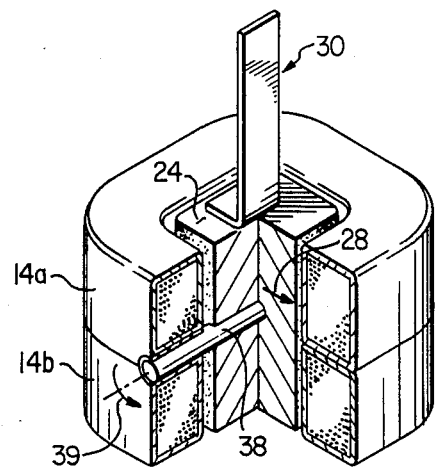
FIG. 2 depicts another transducer embodying the principles and concepts of the invention.

FIG. 2 shows another embodiment of a transducer which is pivotally mounted about an axis extending through the center of gravity of the magnet. Similar elements are numbered in correspondence with the transducer shown in FIG. 1. The permanent magnet 24 has an axle rod 38 fixed to or extending therethrough for rotation about a horizontal axis. The axis of magnet rotation is orthogonal to magnetization of the permanent magnet 24, as shown by vector arrow 28. The coil winding 14 is constructed in two parts 14a and 14b, for accommodating the axle rod 38. The coil windings 14a and 14b are shown generally rectangular in shape, as they would appear after having been wound around a rectangular bobbin. Other coil winding shapes may be better suited for other applications or purposes. When a DC current is applied to the coil windings 14a and 14b, a torque is imposed on the permanent magnet 24, causing pivotal movement about the axle rod 38, as shown by arrow 39. As the permanent magnet 24 rotates, the flapper arm 30, which is attached thereto, also rotates. The movement of the flapper arm 30 cause a corresponding change in the pressure of a gas line in the manner noted above with the transducer of FIG. 1.

Figure 3:
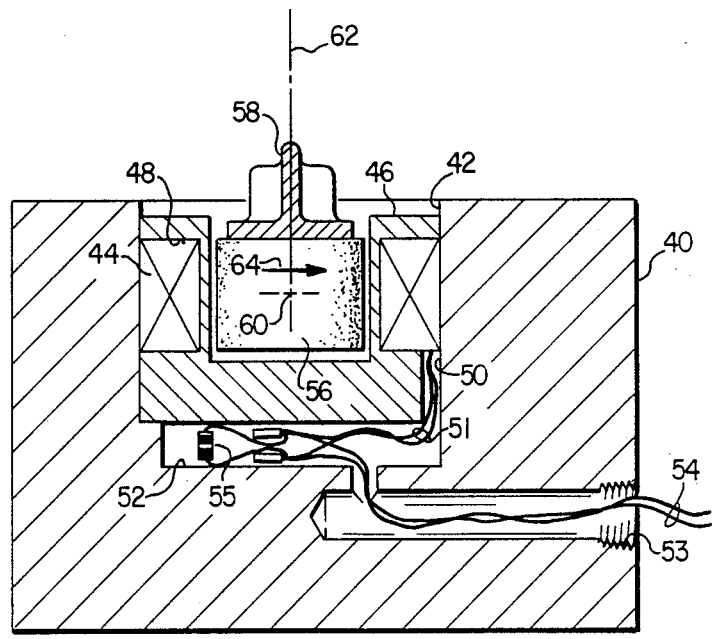
FIG. 3 is a cross-sectional view of the current to mechanical transducer of the invention, illustrating the pivotal permanent magnet mounted to a yoke.

With reference now to FIG. 3, there is illustrated a portion of the current to mechanical transducer constructed in accordance with the preferred embodiment of the invention. Depicted is a transducer body 40 constructed of a 1018 type cold rolled steel, having a bore or cavity 42 for holding a coil winding 44. The steel body 40 functions as a return path for the magnetic flux field generated by the coil winding 44 and for the flux field of magnet 64. The coil winding 44 is wound around a heavy bobbin 46 constructed of a conductive, but nonmagnetic material, such as copper. As used herein, the term nonmagnetic connotes a material having a low permeability to magnet flux. The winding bobbin 46 is cylindrical in form, including an outer annular channel 48 in which the conductor of the coil winding 44 is wound. The bobbin 46 includes a channel 50 for routing therethrough the pigtail ends 51 of the coil winding conductor. The transducer body 40 further includes a chamber 52 which is formed in communication with an internally threaded bore 53 which provides external access to the coil winding conductor ends 51. The chamber 52 provides sufficient room within the explosion-proof transducer body 40 for connecting or splicing thereto heavier gauge wires 54 so that the transducer can be remotely controlled. The chamber 52 can accommodate twist-on splice connectors, or other components, such as diodes 55 for reducing transient voltages across the coil winding 44.

In constructing the transducer of the invention, the bobbin 46 is wound with a small wire gauge to a predetermined number of windings. The bobbin 46 is preferably wound with about 1100 turns of a solid 38 gauge copper wire. The number of turns and wire gauge can be varied to provide other magnetic field intensities for influencing the permanent magnet 56. The pigtail conductor ends 51 are then nested within the channel 50 and all other necessary connections are made thereto and the bobbin unit is then press fit within the bore 42 of the transducer body 40. The heavier gauge wires 54 are, of course, routed through the internally threaded bore 53 of the body 40 to provide external access thereto. The outer diametric dimension of the bobbin 46 is constructed such that it is press fittable within the bore 42 of the transducer case 40. With such an arrangement, the coil winding 44 is entirely enclosed and thus not susceptible to puncture from external objects. Any internal explosion occasioned by sparking of the coil winding conductors is contained within the transducer. The noted construction is thereby considered explosion-proof insofar as an ignition of gases within the chamber 52 caused by the breakage of a coil winding conductor is prevented, which otherwise could cause a spark and ignite explosive gases in the environment around the transducer. A weld can be made along an internal annular edge where the outer edge of the bobbin 46 joins the internal bore 42 of the transducer case 40. A gas tight connection of the metals can be sealed between the winding bobbin 46 and the transducer body 40 by electron beam or laser beam welding. Of course, externally threaded pipe connections can be made to the threaded bore 53 of the body 40 to provide a gas tight conduit for routing the conductors 54 to remote electrical apparatus for controlling the magnitude of the current in the coil winding 44. It can be appreciated that by constructing the transducer of the invention with a movable permanent magnet and a fixed coil winding, the current carrying component can be more easily encased within a gas tight enclosure to render the unit explosion-proof.

Fixed to the top of the high magnetic energy permanent magnet 56 is a lateral portion 58 of a nonmagnetic yoke for pivoting the magnet 56 about a horizontal axis 60. The axis 60 is generally centered symmetrically with respect to the center of gravity of the permanent magnet 56. The lateral portion 58 of the yoke is reinforced sufficiently to prevent twisting of the yoke when the permanent magnet 56 is caused to be rotated. The torsional movement of the permanent magnet 56 is thereby transmitted without loss to all parts of the yoke. The lateral part 58 of the yoke is preferably adhered to the top part of the magnet 56 by a cement or other suitable adherent. Spa adjustments to the transducer can be made by structure to be described in detail below.

In the preferred embodiment of the invention, and for ease of construction, the permanent magnet is rod-shaped and suspended by the lateral part 58 of the yoke in axial alignment with a vertical axis 62 about which the coil winding 44 is centered. As noted above, other coil or magnet shapes, such as rectangular or square, can be employed with equal effectiveness. The diameter of the permanent magnet 56 is 0.62 inch, with a height of about 0.28 inch. The annular spacing between the permanent magnet 56 and the coil winding bobbin 46 is about 1/64th inch. While the noted spacing is small, there is sufficient room for the permanent magnet 56 to pivot sufficiently about lateral axis 60. To be described in more detail below, the slight pivotal movement of the permanent magnet 56, and thus that of the lateral part of the yoke, is accentuated by a lever arm which functions as a flapper. The permanent magnet 56 is obtainable from Hitachi Magnetics in a cross polarized manner, such as noted by vector arrow 64. As noted above, a current induced in the coil winding 44 produces a magnetic field which is effective to coact with the magnetic field of the permanent magnet 56 and thereby rotate the magnet about horizontal axis 60. The permanent magnet 56 can generate a torque of about 0.015 inch-lb. Moreover, the torque produced by the magnet 56 is linearly proportional to the current in the coil winding 44.

Also as noted above, the coil winding bobbin 46 is constructed of a nonmagnetic material, such as brass or copper. Preferably, the bobbin 46 is constructed of thick copper to provide a highly conductive material. In accordance with an important feature of the invention, the conductive, but nonmagnetic bobbin 46 renders the transducer less susceptible to control modulation error due to vibration. It can be appreciated that any vibratory movement of the magnet 56 occasioned by movements of the transducer itself is translated into corresponding movement of the associated arm. This produces an undesired modulation of the transducer output. Any vibration which has a tendency to move the permanent magnet 56 with respect to the coil winding bobbin 4 also induces eddy currents within the bobbin 46. The small eddy currents induced within the bobbin 46 by the movement of the magnet 56 generate a countermagnetomotive force magnetic field which, in turn, counteracts the magnetic field of the magnet, thus offsetting the movement of the magnet 56. These induced eddy currents thereby provide automatic resistance to the vibratory movement of the permanent magnet. Hence, automatic dampening of the permanent magnet 56 is provided to reduce the effects of vibration to which the transducer may be subjected, all without additional, complicated or exotic circuits or equipment. The bobbin 46 essentially functions as one or more shorted turns. As such, equivalent structures can be formed by winding a nonconductive bobbin with one or more shorted turns of a conductor.

The coil winding bobbin 46 is preferably constructed of an OFHC copper having an internal diameter of about 0.67 inch. The outer diameter of the bobbin 46 is about 1.36 inches, press fittable within the bore 42 of the transducer body 40. The outer annular bobbin channel around which the conductor of the coil winding 44 is wound includes a cross-sectional dimension of about 0.28 inch by about 0.37 inch.

Figure 4:
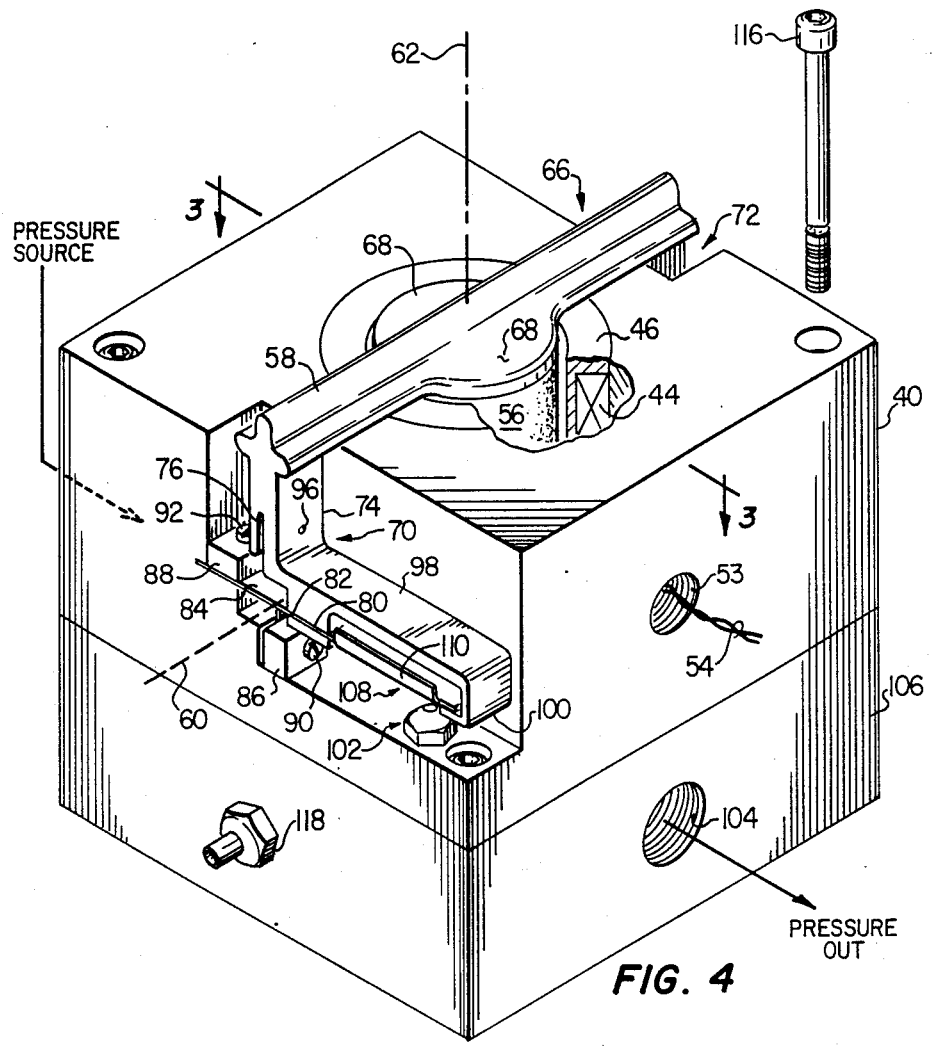
FIG. 4 is an isometric view of the current to mechanical transducer according to the preferred embodiment of the invention, connected in association to pressure apparatus for converting the mechanical output to control a gas pressure.
Figure 5:
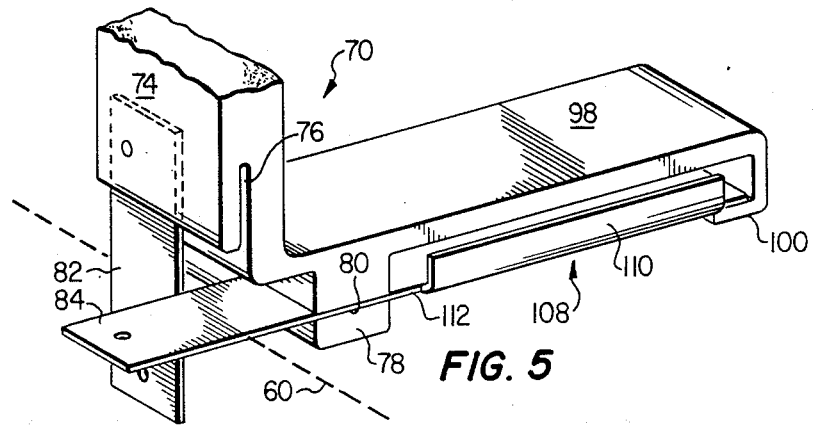
FIG. 5 is an enlarged view of the flexure strips of FIG. 3 utilized to provide a frictionless bearing to the yoke.

With reference now to FIGS. 4 and 5, there is shown in more detail the yoke structure 66 for pivotally suspending the permanent magnet 56 within the coil winding 44. As noted, the yoke 66 includes a lateral part 58 for attachment to the permanent magnet 56. Also, the lateral part 58 is provided with opposing side extensions 68 for providing a larger surface area for adhering to the top of the permanent magnet 56. Formed integral with the lateral part 58 of the yoke 66 are downwardly depending supports 70 and 72. Both downwardly depending supports 70 and 72 and associated bearings are constructed in substantially identical manners.

A vertical part 74 of support 70 includes a vertical slot 76, while a horizontal part 78 of support 70 includes a horizontal slot 80. Slots 76 and 80 are adapted for receiving therein corresponding ends of flexure strips 82 and 84. The other ends of the flexure strips 82 and 84 are anchored to the transducer body 40 by fastening blocks 86 and 88. The fastening blocks 86 and 88 function to secure the ends of the flexure strips 82 and 84 to the transducer body 40 by corresponding screws 90 and 92 extending through the blocks, through holes in the flexure strips 82 and 84 and are threadably secured within the body 40. When fixed in the manner noted, the flexures 82 and 84 define a frictionless bearing for allowing a rotation only about a horizontal axis 60. The flexure strip bearings provide almost no lateral movement, thereby maintaining the permanent magnet 56 accurately and precisely suspended about its center of gravity within a close tolerance within the coil winding bobbin 46.

Because of the close proximity of the magnet 56 to the coil winding bobbin 46, i.e., 1/64th inch, the magnet 56 must be accurately placed and pivoted within the bobbin 46. Spacings greater than 1/64th inch are possible, but at the expense of reduced magnetic coupling between the permanent magnet 56 and the winding bobbin 46. The yoke 66 and the permanent magnet 56 are prevented from moving radially in any direction about horizontal axis 60 as well as axially along vertical axis 62. The permanent magnet 56 is thereby constrained for precise pivotal movement within the coil winding 44. The terms vertical and horizontal are used herein only for easy reference and understanding of the drawings, and are not to be construed as limitations of the invention. Of course, the transducer of the invention can be mounted for operation in any spatial orientation.

The ends of the flexure strips 82 and 84 are cemented within the corresponding slots 76 and 80 of the downwardly depending support 70. Holes, such as 96, are provided in the support so that the adherent or cement can enter such holes and provide an improved securement of the flexure strip ends therein.

The flexure strips 82 and 84 are preferably constructed of beryllium copper to provide the desired flexibility so that the yoke 66 is rotatable about the horizontal axis 60. In addition, the slots 76 and 80 are formed in the downwardly depending support 70 at such a location such that the axis 60 formed by the crossing of the flexure strips coincides with the axial center of the permanent magnet shown in FIG. 2. The magnetic influence generated by the energized coil winding 44 thus pivots the permanent magnet 56 about the horizontal yoke axis 60, and thus also about the lateral center of gravity axis of the permanent magnet. As noted above, the other downwardly depending support 72 of the yoke 66 is pivotally anchored on the other side of the transducer body 40 by similar flexure strip structures.

A lateral rigid arm 98 is formed at the lower end of the downwardly depending support 70 for providing a mechanical output of the transducer. The end of the rigid arm 98 is constructed with an inwardly bent section 100 for engaging an undersurface of the end of a planar spring arm 108. The spring arm 108 is spaced from the nozzle orifice a predetermined distance when the yoke 66 and associated permanent magnet 56 are at a quiescent or rest position. While not shown, the orifice of the nozzle 102 is in fluid communication with the gas stream 104, via connecting channels in the transducer body 40 and attached block 106. The spring arm 108 is biased against the rigid arm 98. The spring arm 108 is constructed of the same material as the flexure strips 82 and 84, and is fixed to the support part 78 by a cement or other adherent, or by suitable fastening hardware. The spring arm 108 includes an angled section 110 formed along its length to provide rigidity thereto so that the spring arm 108 resists bending when subjected to a pressurized stream of gas exiting an orifice in the top of the nozzle 102. A short section 112 of the spring ar 108 is not so reinforced, and thus provides a certain degree of flexibility when the spring arm 108 is forced in abutment with the nozzle 102.

The bottom surface of the transducer body 40 and the top surface of the block 106 are machined to a gas tight finish and bolted together at the corners by screws such as shown by reference character 116. The block 106 is of conventional design having a bore 104 extending therethrough and internally threaded at each end for connection to other connecting pipes. A constant gas pressure source is connected to an inlet side of the bore 104, while the adjusted or controlled gas pressure is obtained from an output side of the block. As described, the orifice of the nozzle 102 is internally connected to such bore 104. Also provided is a restrictor 118 effective to restrict the inlet gas supply.

FIG. 5 illustrates in further detail the lower part of the downwardly depending support 70 of the yoke 66. As can be seen, the vertical slot 76 receives the vertical flexure strip 82, while the horizontal slot 80 receives the horizontal flexure strip 84. When the ends of the flexure strips 82 and 84 are secured to the downwardly depending support 70 in the manner noted, the yoke 66 is supported and constrained for rotation about axis 60. The rotation of the yoke 66 about horizontal axis 60 causes the corresponding movement of the spring arm 108, thereby providing the mechanical output of the transducer. The amount of mechanical movement desired from the transducer, based upon the degree of pivotal movement of the permanent magnet 56, can be set according to the length of the spring arm 108. For a specified angular rotation of the permanent magnet 56, and thus the yoke 66, a wider range of mechanical movement can be obtained by a longer spring arm 108, and vice versa. Also, the spring arm 108 need not be constructed as shown, but can be a diaphragm or other surface which coacts with the nozzle orifice to control the pressure released from the nozzle.

As noted above, the spacing between the permanent magnet 56 and the coil winding bobbin 46 is very small, 1/64th inch, to provide a tight coupling of the magnetic influence between the permanent magnet 56 and the coil winding 44. With such a small spacing, the degree of pivotal movement of the magnet is extremely small, but is multiplied by the length of the spring arm 108. In the preferred embodiment, the distance between the horizontal axis 60 and the orifice of the nozzle 104 is about 0.78 inch. By energizing the coil winding with an electrical current between 4 and 20 milliamp, the spring arm 108 can be caused to move in the range of 0.001-0.003 inch to provide a corresponding pressure change of the gas within the bore 104, between 3-15 psig. As can be appreciated, the spring arm 108 moves very little to produce a substantial change in the gas pressure in the bore 104. It is to be noted that the foregoing results are obtained using a nozzle 102 having an orifice diameter of about 0.040 inch.

While the various parameters of the transducer of the invention have been selected to provide gas pressure control of the type normally utilized in hydrocarbon refinery environments, such parameters and apparatus can be modified such that the transducer can be employed in many other applications. For example, the current supplied to the coil winding 44 can be increased to increase the torque generated by the permanent magnet 56, it being realized that the torque is linearly proportional to the current. The type of material selected for use in the flexure strips 82 and 84 can also be selected to provide a certain degree of resistance to the pivotal movement of the permanent magnet 56. As noted also, the length of the spring arm 108 can be varied or adjusted to achieve a desired range of mechanical movement output from the transducer. Importantly, the permanent magnet 56 can be selected with a desired magnetic intensity so that the force or torque of the pivotal movement thereof is sufficient, based upon the winding turns and current carrying characteristics of the coil winding 44. With the coil winding 44 being fixed, it can be wound with heavy gauge wire, on a thick bobbin, to provide high degree of dampening to the transducer. Preferably, the magnetic intensity of the permanent magnet 56 is maximum, thereby requiring a smaller magnetic field generated by the coil winding 44. In the preferred embodiment, a lightweight neodymium-iron-boron composition permanent magnet is capable of providing an extremely high magnetic intensity, while still maintaining the magnet at a size suitable for use in transducer applications. By employing slight pivotal movement of a magnet, the moment of inertia is maintained small, thereby providing a transducer responsive to quickly changing coil currents. While the transducer shown in FIG. 4 depicts the major components for illustrating the principles and concepts of the invention, other components will generally be required to provide adequate calibration, linearity, zeroing and maintenance of the operational characteristics of the transducer.

The transducer shown in FIG. 4 can be easily adapted for providing dual control of pressures by a single current input. For example, the downwardly depending support 72 can also be fitted with an arm and spring member structure similar to that attached to opposing support 70, and adapted for operating in conjunction with another nozzle. Such other arm structure can be oriented in a direction opposite to that of rigid arm 98, for providing an inverse control over another gas pressure. In other words, the transducer 106 can be modified to provide another bore and associated nozzle, the pressure of which is controlled by the movement of an arm connected to the downwardly depending support 72. With such an arrangement, when a current is applied to the coil winding 44, via conductors 54, the yoke 66 will rotate in an associated direction, thereby moving the arm structures in opposing directions with respect to their respective nozzles. One arm will move closer to its associated nozzle, while the other arm will move away from its nozzle, thereby providing the inverse control of the respective gas pressures. As an alternative, the dual arms of the transducer can be oriented in the same direction to provide a common control of gas pressures in a pair of bores within the block 106, both increasing or decreasing the respective gas pressures by the pivotal movement of the permanent magnet 56 and yoke 66. Yet other options are available with the noted transducer construction. For example, the transducer can be assembled using identical parts, but outfitted with an arm either on yoke support 70 or 72 to provide transducers with opposite adjustment or control characteristics. With such a versatile construction, the same parts can be used to provide a transducer which increases an output gas pressure with increasing coil winding current, or one which decreases an output gas pressure, also with an increasing coil winding current.

An electrical to mechanical transducer, such as that constructed in accordance with the invention, does not require external feedback provisions for maintaining a desired gas pressure output based upon a predefined input current. Also, because the torque of the permanent magnet 56, and thus that of the spring arm 108 is proportional to the current in the coil winding 44, the movement of the spring arm 108 linearly follows changes in the coil winding current. Also, the force exerted by the nozzle gas on the spring member 108 is proportional to the product of the gas pressure and nozzle orifice area. In a state of operational equilibrium, the torque of the spring arm 108 is in balance with the force exerted thereon by the gas escaping from the nozzle orifice. Any error or imbalance causes the nozzle to open or close, thereby changing the force until it is again in balance with the torque of the spring arm 108. By appropriately calibrating the spacing of the spring arm 108 with respect to the orifice of the nozzle 102 when the permanent magnet 56 is at a rest position, desired gas pressures in the bore 104 can be obtained by driving the coil winding 44 with predetermined DC levels of current.

As noted above a self-feedback of the transducer is provided without requiring additional circuits or hardware, and serves to improve the linearity of the transducer. Thus, as the current supplied to the coil winding 44 increases to increase the torque, the spring arm 108 moves clockwise in FIG. 4, until there is an equilibrium with the upward gas pressure force which resists downward spring arm movement. As a result, the spring arm 108 moves closer to the orifice of the nozzle 102. Gas pressure escaping from the orifice or the nozzle 102 becomes restricted, thereby increasing the gas pressure in the bore 104. By this action, the gas pressure exiting the orifice of the nozzle 102 also increases, thereby providing additional force in resistance to the further downward movement of the spring arm 108. A quiescent state is reached in which the force of the pressure of the nozzle orifice counterbalances the rotational torque of the spring arm 108 imposed on it by the permanent magnet 56. As can be appreciated, the cooperation between the self-feedback and the movable permanent magnet of the transducer provides sufficient feedback to provide a stable transducer, all without additional circuits or equipment.

While the self-feedback may be sufficient for small pressure applications, other external apparatus may be required to match a small-size pressure transducer to large size pressure lines and the like. For example, various bellows, pistons and diaphragms well known in the art may be utilized as external coupling equipment as gain producing apparatus adapting large nozzle pressures to the transducer of the invention.

FIG. 6 illustrates a portion of a magnet yoke 114 to which a permanent magnet 56 can be mounted for adjustable rotation to vary the span of the transducer. As used herein, the span of a transducer defines the extent of the mechanical output for a given input current. In other words, the yoke 114 of FIG. 6 can be utilized to provide a different distance of spring arm movement for a predefined change in the input coil winding current.

The yoke 114 includes a widened lateral section 115 with a vertical hole therethrough for receiving an adjustment screw 116. A circular disc 117 is fixed to the lower end of the screw 116. The disc 117 provides a base to which the permanent magnet 56 can be secured. With this construction, the magnet 56 can be rotatably oriented to reduce the optimum effect of its magnetic field with that of the coil winding, and thus reduce the extent of the mechanical output. Once the magnet 56 is adjusted so that the vector of its magnetic poles is no longer orthogonal with respect to the axis of pivotal movement, a nut 118 can be tightened to fix the magnet 56 at the desired angular orientation. Angular degree or other index marks can be formed on the widened part 115 for gauging with a corresponding vector mark on the magnet so that assembly of the parts to a particular angular orientation can be facilitated.

The extent of the span adjustment can be determined according to the relationship $S = \sin \theta$, when S is the output pressure span and $\theta$ is the angle between the axis 60 and that of the magnetic vector arrow 64. As can be seen, when the magnet 56 is oriented so that the vector arrow 64 is orthogonal to rotational axis 60, the span is maximum. When the magnet 56 is oriented so that the angle $\theta'$ is 30° such as shown by 64', the span will be reduced by one half. It is to be noted that the angular orientation of the permanent magnet 56 if less than 90°, reduces the effective coupling between the magnetic flux of the magnet and the winding, and thus less torque is produced by the magnet. A very efficient technique can thus be realized for achieving different spans. In addition, by completely reversing the permanent magnet 56, the direction of magnet rotation is reversed. By providing a mechanism for easily reversing the mechanical movement of the transducer, the arm and nozzle duplication may not be required.

FIG. 7 illustrates another embodiment of the invention in which a permanent magnet is movable within a magnetic field to provide a mechanical output, and preferably the capability to change a pressure in a gas stream. In this embodiment, a compact lightweight permanent magnet 120 has a high magnetic intensity, preferably constructed of neodymium-iron-boron. The magnet 120 has a soft iron upper cap 123 fixed to its upper surface. A similar lower cap 125 is fixed to the bottom of the magnet. The caps function to concentrate the magnetic flux from the magnet, which magnetic flux extends radially outwardly from the upper cap 123 of the magnet and radially inwardly to the lower cap 125. The permanent magnet 120 is fixed to a vertically-oriented axle rod 122. The permanent magnet is vertically polarized, such as shown by vector arrow 121. A bottom portion of the rod 122 is supported by a spoked structure 124 which is centered within a cavity 126 of a transducer body 128 by a number of radially extending spoke supports 130. The bottom spoke supports 130 are somewhat flexible to allow slight downward motion of the rod 122 when the magnet 120 is forced downwardly.

An upper portion of the magnet rod 122 is fixed by another spoke arrangement 132 to an annular counterweight ballast 134. The upper spokes 133 are rigid and of the nonflexible type. The ballast ring 134 is axially movable within an upper cavity 136 of an upper transducer case 140. The ballast ring 134 and associated permanent magnet rod support structure 132 are somewhat movable in the cylindrical cavity 136 along vertical axis 138. Each rigid spoke of the upper rod support 132 rests on a pivot point, such as 139, to center the magnet 120 at a desired location with respect to the coil windings 142 and 144. The rigid spokes and counterbalance 134 offset the effects of vibration to which the transducer may be subjected. The details of this structure will be described more thoroughly below.

A pair of annular coil windings 142 and 144 are connected together in series and are fixed within a cylinder housing 146 which, in turn, is fixed with respect to the lower transducer body 128. The clockwise current in winding 142 acts on the radial flux out of the upper cap 123 to produce a force. The counterclockwise current in winding 144 acts on the radial flux into the lower cap 125 to produce an additive force. The cylinder housing is constructed with a permeable material for carrying the magnetic flux of the magnet 120 and the windings 142 and 144. Because of the much higher magnetic intensity of the magnet of the invention, a majority of the flux carried by the cylinder housing 146 is that which is generated by the magnet 120. The cylindrical enclosure 146 has an exit port equipped with a tubular conduit 148 for routing therethrough the conductors 150 of the coil windings 142 and 144. As with the embodiment described above, both coil windings 142 and 144 are encased by an explosion-proof enclosure 152 to render the transducer unit explosion-proof. The upper and lower body parts 140 and 128 of the transducer are fixed to a lower block 154 by way of screws (not shown) passing through holes 156 in the transducer and secured within threaded holes 158 of the block 154. The block 154 conventionally includes a pressure input supplied with a constant gas pressure, and an orifice-type nozzle 160 which cooperates with a push rod 162 fastened to the bottom of the permanent magnet rod 122. The vertical movement of the push rod 162 adjacent the nozzle 160 provides appropriate adjustment of the gas pressure output from the block 154. The diameter of the push rod 162 is larger than the orifice in the nozzle 160, and thus can completely shut it off.

In operation, when a current is applied to the conductors 150 of the coil windings 142 and 144, a corresponding magnetic field is generated. The magnetic field influences the permanent magnet 120 for movement along the vertical axis 138. Were it not for the fixation of the windings 142 and 144, the windings would move about the magnet 120. However, because the permanent magnet 120 is movable and is polarized in the direction shown by the vector arrow 121, such magnet 120 moves axially along the noted vertical axis 138. The slight flexing of the lower support spokes 130 and the pivoting of the upper spokes 133 at the pivots 139 allow slight movement of the permanent magnet stem 122. The ends of the upper spokes 133 flex enough to allow pivoting movement. Again, with this embodiment, the vertical movement of the magnet 120 is linear with regard to the magnitude of the current applied to the coil windings 142 and 144. Thus, by applying a desired current to the coil windings 142 and 144, the permanent magnet 120 is caused to move along axis 138, thereby moving the push rod 162 with respect to the nozzle 160. The gas pressure output from the transducer block 154 is thus varied or adjusted accordingly. The end surface of the push rod 162, coacting with the pressure released from the nozzle 160, provides a feedback from the nozzle, much like that described above in connection with the spring arm 108.

Because the permanent magnet 120 is preferably constructed of a neodymium-iron-boron composition, the mass thereof can be made relatively small, while no compromise is made in the magnetic intensity thereof. The inherent resonant frequency of the transducer is thus high, as is the response characteristic to quickly changing input electrical currents.

As noted above, the upper spoked support 132 is fixed to the upper part of the permanent magnet rod 122, but yet maintains the permanent magnet 120 centered for movement within the coil windings 142 and 144. When a current of a desired polarity is applied to the coil windings 142 and 144, the permanent magnet 120 moves downwardly to restrict the orifice in the nozzle 160, thereby increasing the pressure output by the transducer block 154. At the same time, the spokes 133 associated with the upper rod support 132 pivot somewhat about the points 139 and flex downwardly in the center as a result of the pull thereon by the permanent magnet 120 attached to the rod 122.

Any vibration which the transducer may encounter can be translated through the transducer frame assembly, to the magnet and rod 122, and thus to the push rod 162. As a result, vibration tends to cause a corresponding movement of the push rod 162 over the nozzle 160 and modulate the output gas pressure in like manner. Of course, such modulation is undesired as it represents a changing pressure not arising from a control parameter change, i.e., a current in the coil windings 142 and 144. The annular counterbalance 134 reduces the tendency of the permanent magnet 120 to respond to vibration movement, as such movements are offset by corresponding movements of the counterbalance ballast 134. In other words, a vibrational movement applied to the transducer in a direction to move the permanent magnet 120 downwardly, also moves the counterbalance ballast 134 downwardly. The counterbalance ballast 134 acting on the spokes 133 through the pivot points 139 tends to raise the permanent magnet 120, thereby offsetting the downward force thereon attendant with the vibration. Coil windings 142 and 144 are wound on bobbin 143 which is preferably constructed of highly conductive, nonmagnetic material such as copper. Any vibration motion is thereby further reduced by forces resulting from eddy currents in bobbin 143 in a manner similar to the manner in which movement of aforesaid magnet 56 is counteracted by eddy currents in bobbin 46. A transducer of improved accuracy is thereby realized. The self-feedback described above in connection with the embodiment of FIG. 4 is also available with the alternate embodiment of FIG. 7.

From the foregoing, disclosed is an improved transducer having numerous technical advantages. An important technical advantage presented by the invention is that an accurate and reliable transducer, can be constructed at a cost-effective price. Another technical advantage of the invention is that by employing a movable permanent magnet in association with fixed winding, explosion-proofing the unit is facilitated. A related technical advantage of the explosion-proofing technique of the invention is that flame arrestor apparatus is not required for operating the transducer. Yet another technical advantage of the invention is that by employing a neodymium-iron-boron permanent magnet having an extremely high intensity magnetic field, the transducer can be fabricated more compactly to better utilize the available input current. An associated technical advantage of the foregoing is that by utilizing a small permanent magnet, but with a high magnetic intensity, the response time thereof to changes in current are maintained in correspondence, whereby faster transitions of the coil currents are followed by corresponding positional changes in the permanent magnet. A further technical advantage of the invention is that vibration modulation of the transducer output is reduced. The invention provides yet another technical advantage for span adjustment, in that the permanent magnet can be mounted for less than maximum magnetic influence with the coil winding flux, or even reversed to change the direction of mechanical output.

While the preferred and other embodiments of the invention have been disclosed with reference to specific transducer constructions, and methods of fabrication thereof, it is to be understood that many changes in detail may be made as a matter of engineering choices without departing from the spirit and scope of the invention, as defined by the appended claims.

What is claimed is:

1. An electrical to mechanical transducer, comprising:
    a coil winding adapted for carrying a current to provide a magnetic field, said winding being wound so as to define an opening having an axis coaxial with magnetic flux lines of the magnetic field;
    a high energy magnetic material having an energy greater than about 30,000,000 gauss-oersted, disposed in the opening of said winding, and of the type which is moved in response to the magnetic field generated by said winding, said magnet being disposed in said coil winding opening such that the polarization thereof is orthogonal to the magnetic flux lines; and
    a coupling arm connected to said magnetic material and movable in response to the movement of said magnetic material to provide a mechanical output of said transducer.

2. The transducer of claim 1, wherein said magnetic material comprises a rare earth magnetic material.

3. The transducer of claim 2, wherein said magnetic material comprises neodymium-iron-boron.

4. The transducer of claim 1, further including a bobbin for supporting said coil windings, said bobbin being mounted to a transducer body and including a central bore concentric with said opening.

5. The transducer of claim 4, wherein said magnetic material is suspended within said bore of said bobbin and spaced therefrom.

6. The transducer of claim 4, wherein said bobbin is constructed with a material comprising a nonmagnetic conductor.

7. The transducer of claim 1, further including an explosion-proof enclosure fixed around said coil winding.

8. The transducer of claim 7, wherein said explosion-proof enclosure comprises a bobbin around which said coil winding is wound.

9. The transducer of claim 8, further including a transducer body having an opening through which ends of said coil winding are routed, and means for fixing a conduit to said opening for routing conductors to said coil winding.

10. An electrical to mechanical transducer, comprising:
    a winding adapted for carrying a current and producing a magnetic field, said winding being centered about a first axis;
    a permanent magnet movably mounted with respect to said winding and magnetized in a direction generally orthogonal to said first axis so that when said winding is energized with a current, said magnet pivots about a second axis orthogonal to said first axis; and
    an arm mounted for movement in association with said magnet to provide a mechanical output.

11. The transducer of claim 10, wherein said arm is mounted for movement about said second axis.

12. The transducer of claim 10, wherein said magnet is fixed about an axis of pivotal movement by flexure strips.

13. The transducer of claim 10, further including a transducer body, and a yoke fixed to said magnet, and including supports depending downwardly along opposing sides of said magnet, a pair of bearings mounted between said yoke supports and said transducer body to allow pivotal movement of said magnet about said second axis.

14. The transducer of claim 13, wherein said bearings comprise plural flexure strips.

15. The transducer of claim 13, wherein each said yoke support is adapted for fixing thereto an arm.

16. The transducer of claim 10, wherein said magnet is characterized as having a magnetic energy greater than about 30,000,000 gauss-oersted.

17. The transducer of claim 16, wherein said magnet comprises a composition of neodymium-iron-boron.

18. The transducer of claim 16, wherein said magnet has a moment of inertia less than that of said winding and a bobbin around which said winding is wound.

19. The transducer of claim 10, further including an enclosure for encasing said winding to said body for rendering said transducer explosion-proof.

20. The transducer of claim 10, wherein said arm defines a surface, and further including a nozzle functioning with said surface to control a gas pressure.

21. The transducer of claim 10, further including a cylindrical bobbin around which said winding is wound, and wherein said magnet is suspended for pivotal movement within said bobbin.

22. The transducer of claim 21, wherein said permanent magnet is spaced from said bobbin a distance less than 1/32 inch.

23. The transducer of claim 21, wherein said magnet is adapted to pivotally move within said bobbin less than 1°.

24. The transducer of claim 10, further including mounting apparatus for mounting said magnet with a characteristic magnetic vector oriented at a desired angle with respect to said second axis to provide span adjustments to said transducer.

25. An electrical to mechanical transducer, comprising:
    a body for providing a frame structure for said transducer, said body having a cylindrical bore therein;
    a cylindrical bobbin of nonmagnetic material having an outer annular channel, and adapted for fitting in said bore of said transducer body;
    a coil winding wound around the channel of said bobbin so that when said bobbin fits in said body, said winding is contained;
    a permanent magnet;
    a yoke structure having a lateral section attached to said permanent magnet for suspending said magnet within an opening in said cylindrical bobbin, said yoke including a depending support connected to each end of said lateral section;
    a bearing attached between each said yoke support and said body to allow pivotal movement of said magnet about an axis which extends through said magnet; and an arm structure associated with said magnet so that when said magnet is pivoted under the influence of a magnetic field generated by said coil winding, a mechanical output of said transducer is produced.

26. The transducer of claim 25, wherein said magnet is spaced a small distance from said cylindrical bobbin.

27. The transducer of claim 26, wherein said spacing is no greater than about 1/64th inch.

28. The transducer of claim 25, wherein said permanent magnet comprises neodymium, iron and boron.

29. The transducer of claim 25, wherein said bearings comprise flexure strips.

30. The transducer of claim 25, further including a nozzle cooperating with said arm to provide control over a gas pressure.

31. The transducer of claim 25, wherein said permanent magnet is cross-field polarized.

32. The transducer of claim 25, further including means for mounting said magnet at different angular orientations to said yoke structure.

33. The transducer of claim 30, further including feedback means for counterbalancing said mechanical output in proportion to an output gas pressure.

34. An electrical to mechanical transducer, comprising:
   a body for providing a frame structure to said transducer, said body having sidewalls and a bottom to define a cylinder with a closed end;
   a winding held within said transducer body, said winding being disposed about a first axial axis;
   a protective cover for enclosing said winding and press-fit to the internal sidewalls of said body to provide an explosion-proof transducer;
   a singe permanent magnet pivotally mounted within an opening of said winding for allowing movement thereof in response to a magnetic field generated by currents applied to said winding; and
   means for mounting said magnet for pivotal movement above a second axis within said winding opening so that in response to the magnetic field generated by said winding, said magnet, pivots about said second axis which is generally orthogonal to said first axis.

35. The transducer of claim 34, wherein said protective cover comprises a bobbin around which said winding is wound.

36. The transducer of claim 35, wherein said transducer body comprises a magnetic material for providing a magnetic path for magnetic flux of the magnet.

37. The transducer of claim 35, wherein said bobbin is constructed of an electrically conductive material.

38. The transducer of claim 34, further including a weld for fixing said cover to said body.

39. A method for constructing a transducer for converting an electrical input current to a mechanical output, comprising the steps of:
   fixing a winding to a transducer case such that said winding has a central opening;
   suspending a permanent magnet in the central opening of said winding so that a magnetic vector of the permanent magnet is oriented diametrically in said opening;
   mounting said magnet for pivotal movement so as to be movable under a magnetic influence produced by an electrical current in said winding; and
   fixing an arm to said magnet to produce a mechanical output.

40. The method of claim 39, further including fixing said magnet for pivotal movement no more than about 0.1°.

41. The method of claim 39, further including forming the winding around a cylindrical bobbin, and closely spacing said magnet within said cylindrical bobbin.

42. The method of claim 39, further including selecting said magnet with a neodymium, iron and boron composition.

43. The method of claim 39, further including employing a magnet having a magnetic energy greater than about 30,000,000 gauss-oersted.

44. The method of claim 39, further including covering said winding with an explosion-proof enclosure.

45. The method of claim 44, further including forming the winding around a bobbin, and fixing the bobbin to the case to provide an explosion-proof enclosure around said winding.

46. The method of claim 45, further including welding the bobbin to the case.

47. The method of claim 39, further including mounting a nozzle proximate said arm to transform the mechanical output to a pressure control.

48. The method of claim 47, further including employing self feedback of a gas pressure emitted by said nozzle on said arm to stabilize the transducer.

49. A method for constructing a current to mechanical transducer, comprising the steps of:
   fixing a reel-shaped winding within a cavity of a case so that said winding is centered about an axis;
   mounting a permanent magnet with respect to said case so that said magnet is suspended within an opening of said winding and so that said magnet is pivotal about an axis generally orthogonal to the axis of said winding, whereby said magnet moves when influenced by a magnetic field generated by a current through said winding; and
   fixing an arm to said magnet to provide a mechanical output when said magnet is rotated.

50. The method of claim 49, further including providing said transducer with said permanent magnet constructed of a composition comprising neodymium-iron-boron.

51. The method of claim 49, further including fixing a nozzle proximate said arm so that a gas pressure can be controlled by current in said winding.

52. The method of claim 49, further including employing a magnet with a cross-field polarized magnetization.

53. The method of claim 49, further including fixing said magnet to a mounting structure at a desired angular orientation to provide a desired span output of said transducer, said angular orientation being about an axis different from an axis about which said magnet pivots.

54. A method for controlling a gas pressure with an electrical current, comprising the steps of:
   directing a current which is proportional to a desired gas pressure through a coil winding to generate a magnetic field;
   mounting a permanent magnet for pivotal movement about an axis extending through the magnet, in an area under the influence of the magnetic field such that the magnet pivots in an amount generally proportional to the magnitude of the electrical current; and moving an arm in correspondence to the pivotal movement of the magnet proximate an orifice of a nozzle to control the escape of gas from the nozzle and thereby control a gas pressure.

55. The method of claim 54, further including pivotally moving said magnet less than 1° in response to electrical currents between about 4–20 ma.

56. The method of claim 54, further including employing a large magnetic field of said permanent magnet and a smaller magnetic field of said winding to effect movement of said magnet.

57. The method of claim 54, further including employing a cross-field polarized magnet which is pivotal about an axis which is transverse to an axis about which the winding is wound.

58. The method of claim 54, further including utilizing a feedback to stabilize movement of said arm in response to vibration.

59. The method of claim 58, further including employing eddy currents generated by movements of said permanent magnet to stabilize movements of said magnet.

60. An electrical to mechanical transducer, comprising:
   a coil winding adapted for carrying a current to provide a magnetic field, said winding being wound so as to define an opening;
   a high energy magnetic material having an energy greater than about 30,000,000 gauss-oersted, mounted in the opening of said winding, for rotation about an axis transverse to the axis of said coil opening, said magnet being of the type which is moved in response to the magnetic field generated by said winding; and
   a coupling arm connected to said magnetic material and movable in response to the movement of said magnetic material to provide a mechanical output of said transducer.

61. The transducer of claim 60, wherein said magnet is cross-field polarized and including means for adjustably mounting said magnet at a desired angle with respect to said axis of movement.

62. The transducer of claim 60, wherein said permanent magnet is cross-field magnetized for pivotally moving when influenced by said magnetic field.

63. The transducer of claim 60, further including a surface associated with said magnetic material and movable therewith to produce said mechanical output.

64. The transducer of claim 63, further including a nozzle cooperating with said surface to produce a pressure control.

65. The transducer of claim 64, further including flexure strips for mounting said magnetic material for movement about said transverse axis.

66. An electrical to mechanical transducer, comprising:
   a coil winding adapted for carrying a current to provide a magnetic field, said winding being wound so as to define an opening;
   a high energy magnetic material having an energy greater than about 30,000,000 gauss-oersted, disposed in the opening of said winding, and of the type which is moved in response to the magnetic field generated by said winding;
   a bobbin constructed of a nonmagnetic conductor for supporting said coil, said bobbin having short circuit turns and being mounted to a transducer body and having a central bore concentric with said coil winding opening; and
   a coupling arm connected to said magnetic material and movable in response to the movement of said magnetic material to provide a mechanical output of said transducer.

67. An electrical to mechanical transducer, comprising:
   a coil winding adapted for carrying a current to provide a magnetic field, said winding being wound so as to define an opening;
   a high energy magnetic material having an energy greater than about 30,000,000 gauss-oersted, disposed in the opening of said winding, and of the type which is moved in response to the magnetic field generated by said winding;
   a yoke for mounting said magnetic material for pivotal motion, said yoke being fixed to said magnetic material for suspension in said coil winding opening; and
   a coupling arm connected to said yoke and movable in response to the movement of said magnetic material to provide a mechanical output of said transducer.

68. The transducer of claim 67, further including means for mounting a pair of said arms to said yoke such that a pivotal movement of said magnetic material causes a corresponding movement of each arm.

69. The transducer of claim 67, further including a transducer body and flexure strip bearings for pivotally mounting said yoke to said transducer body.

70. A method for constructing a transducer for converting an electrical input current to a mechanical output, comprising the steps of:
   fixing a winding to a transducer case;
   mounting a permanent magnet for pivotal movement so as to be movable under a magnetic influence provided by an electrical current in said winding;
   mounting a yoke structure to said magnet for allowing pivotal movement thereof about an axis which extends through the magnet; and
   mounting an arm for movement in correspondence with movement of said magnet to produce a mechanical output.

71. The method of claim 70, further including mounting said yoke to said magnet so that said magnet is suspended within an opening of said winding.

72. The method of claim 70, further including pivotally mounting said yoke to said case with flexure strips.

73. The method of claim 70, further including mounting said magnet to said yoke such that a magnetizing vector of said magnet is nonorthogonal to an axis of rotation of said magnet to thereby provide span adjustments to said transducer.

74. A method for constructing a current to mechanical transducer, comprising the steps of:
   fixing a reel-shaped winding within a cavity of a case so that said winding is centered about a first axis;
   providing a magnet mounting yoke;
   mounting a permanent magnet to said mounting yoke;
   mounting said yoke to said case for pivotal movement about a second axis transverse to said first axis, and mounting said yoke for limited rotation when said magnet is influenced by a magnetic field generated by a current through said winding; and
   mounting an arm for movement in correspondence with movements of said magnet to provide a mechanical output when said magnet is pivoted.

75. The method of claim 74, further including mounting said magnet for pivotal movement about said second axis which extends substantially through a center of gravity of said magnet.

76. A method for constructing a current to mechanical transducer, comprising the steps of:
fixing a reel-shaped winding within a cavity of a case so that said winding is centered about an axis;
providing a magnet mounting structure;
mounting a permanent magnet to said mounting structure;
pivotally mounting said structure to said case with flexure strips to limit rotation when said magnet is influenced by a magnetic field generated by a current through said winding; and
mounting an arm for movement in correspondence with movements of said magnet to provide a mechanical output when said magnet is pivoted.

77. A method for controlling a gas pressure with an electrical current, comprising the steps of:
directing a current which is proportional to a desired gas pressure through a coil winding to generate a magnetic field;
pivoting a permanent magnet about an axis therethrough in an area under the influence of the magnetic field such that the magnet pivots in an amount generally proportional to the magnitude of the electrical current; and
moving an arm in correspondence to the pivotal movement of the magnet proximate an orifice of a nozzle to control the escape of gas from the nozzle and thereby control a gas pressure.

78. A method for controlling a gas pressure with an electrical current, comprising the steps of:
directing a current which is proportional to a desired gas pressure through a coil winding to generate a magnetic field;
pivoting a permanent magnet for pivotal movement by a pair of flexure strips in an area under the influence of the magnetic field such that the magnet pivots in an amount generally proportional to the magnitude of the electrical current; and
moving an arm in correspondence to the pivotal movement of the magnet proximate an orifice of a nozzle to control the escape of gas from the nozzle and thereby control a gas pressure.

79. A method for controlling a gas pressure with an electrical current, comprising the steps of:
directing a current which is proportional to a desired gas pressure through a coil winding to generate a magnetic field;
pivoting a permanent magnet in an area under the influence of the magnetic field such that the magnet pivots in an amount generally proportional to the magnitude of the electrical current;
providing a desired span output of said transducer by orienting said magnet at a nonorthogonal angle between a pivotal axis of the magnet and a polarization vector of said magnet; and
moving an arm in correspondence to the pivotal movement of the magnet proximate an orifice of a nozzle to control the escape of gas from the nozzle and thereby control a gas pressure.

80. The method of claim 77, further including mounting the permanent magnet for pivotal movement within the coil winding.

81. An electrical to mechanical transducer, comprising:
a coil winding adapted for carrying a current representative of a 4–20 milliamp line signal to provide a corresponding magnetic field;
a high energy magnet movable under the influence of the magnetic field generated by said coil winding, said magnet exhibiting a magnetic field strength greater than that generated by currents carried by said coil winding; and
a magnet mounting structure for constraining said magnet to pivotal movement in response to the magnetic field generated by said coil winding.

82. The transducer of claim 81, wherein said mounting structure suspends said magnet within an opening in said coil winding.

83. The transducer of claim 81, wherein said mounting structure constrains said magnet to pivotal movement about an axis extending through the magnet.

84. The transducer of claim 81, wherein said magnet has an energy of about 30 million gauss-oersted.

* * * * *

UNITED STATES PATENT AND TRADEMARK OFFICE
CERTIFICATE OF CORRECTION

PATENT NO. : 4,926,896
DATED : May 22, 1990
INVENTOR(S) : Robert C. Prescott et al.

It is certified that error appears in the above-identified patent and that said Letters Patent is hereby corrected as shown below:

```
Column  4, line 25, change "332" to --32--.
Column  6, line 57, change "Spa" to --Span--.
Column  7, line 31, change "bobbin 4" to --bobbin 46--.
Column 11, line 39, change "or the" to --of the--.
Column 17, line 36, change "singe" to --single--.
Column 17, line 41, change "above" to --about--.
Column 18, line 42, change "rotated" to --pivoted--.
Column 19, line 67, after "coil", insert --winding--.
Column 20, line 38, change "provided" to --produced--.
Column 21, line 38, change "pivoting" to --mounting--.
Column 22, line  8, change "pivoting" to --mounting--.
```

Signed and Sealed this

Seventeenth Day of March, 1992

Attest:

HARRY F. MANBECK, JR.

Attesting Officer     Commissioner of Patents and Trademarks